United States Patent

Bradbury et al.

[11] Patent Number: 5,855,790
[45] Date of Patent: Jan. 5, 1999

[54] MAGNETIC PARTICLES, A METHOD FOR THE PREPARATION THEREOF AND THEIR USE IN THE PURIFICATION OF SOLUTIONS

[75] Inventors: David Bradbury; George Richard Elder, both of Gloucester, United Kingdom; Adel Taha Sayed Ahmed Hendawi, Alpharetta, Ga.

[73] Assignee: Selective Environmental Technologies, Inc., Atlanta, Ga.

[21] Appl. No.: 696,858

[22] PCT Filed: Feb. 7, 1995

[86] PCT No.: PCT/US95/01543

§ 371 Date: Jan. 6, 1997

§ 102(e) Date: Jan. 6, 1997

[87] PCT Pub. No.: WO95/21011

PCT Pub. Date: Aug. 10, 1995

[30] Foreign Application Priority Data

Feb. 7, 1994 [GB] United Kingdom .................. 9402334

[51] Int. Cl.⁶ ............................. B01D 15/04; B01D 35/06
[52] U.S. Cl. ......................... 210/676; 210/670; 210/679; 210/688; 210/695; 210/222; 210/490; 210/502.1; 210/503; 210/504; 210/505; 210/506; 262/62.51 R; 262/62.53; 262/62.54; 262/62.56; 428/393; 428/394; 436/526; 436/530
[58] Field of Search ..................................... 210/670, 676, 210/679, 688, 695, 490, 222, 502, 503, 504, 505, 506, 510.1; 252/62.51 R, 62.53, 62.54, 62.56; 427/127; 428/392, 393, 394, 395; 436/526, 530

[56] References Cited

U.S. PATENT DOCUMENTS

| | | |
|---|---|---|
| 4,134,831 | 1/1979 | Dawson et al. . |
| 4,582,622 | 4/1986 | Ikeda et al. ........................... 252/62.53 |
| 4,628,037 | 12/1986 | Chagnon et al. ........................ 436/526 |
| 4,661,327 | 4/1987 | Horton ........................................ 423/7 |
| 4,675,113 | 6/1987 | Graves et al. ........................... 210/635 |
| 4,687,748 | 8/1987 | Schroder ................................. 436/526 |
| 4,695,392 | 9/1987 | Whitehead et al. ................. 252/62.54 |
| 4,795,698 | 1/1989 | Owen et al. ............................. 436/526 |
| 4,861,705 | 8/1989 | Margel et al. .............................. 435/2 |
| 4,935,147 | 6/1990 | Ullman et al. .......................... 210/695 |
| 5,397,476 | 3/1995 | Bradbury et al. ....................... 210/675 |

FOREIGN PATENT DOCUMENTS

| | | |
|---|---|---|
| 0 302 293 | 7/1988 | European Pat. Off. . |
| 0 522 856 | 9/1992 | European Pat. Off. . |
| 63-175686 | 7/1988 | Japan . |
| 2 170 736 | 8/1986 | United Kingdom . |

*Primary Examiner*—David A. Reifsnyder
*Attorney, Agent, or Firm*—Jones & Askew, LLP

[57] ABSTRACT

Magnetic particles which comprise a core of a magnetic material surrounded by a mixture of a fibrous material and a solid binding agent. The particles may be embedded in a polymer resin which incorporates sites, which are selective for particular ions, to form composite magnetic resin particles. The composite magnetic resin particles may be used for the removal of pollutant ions from an aqueous solution in which they are contained.

20 Claims, 2 Drawing Sheets

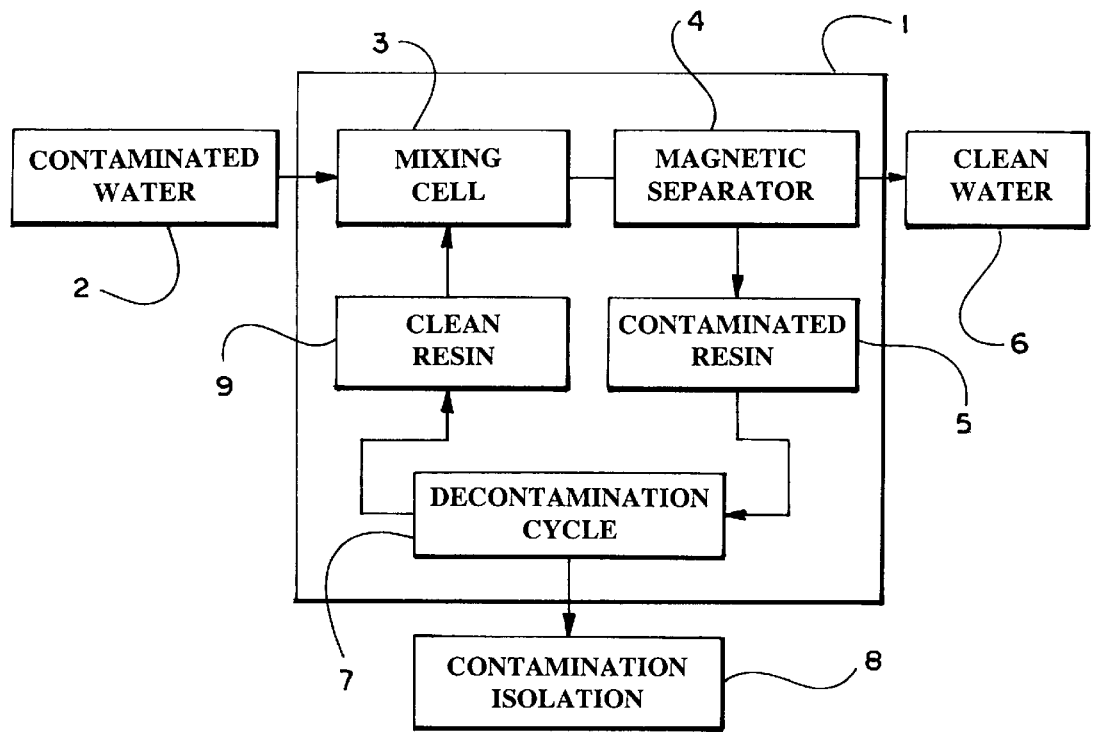
Fig_1
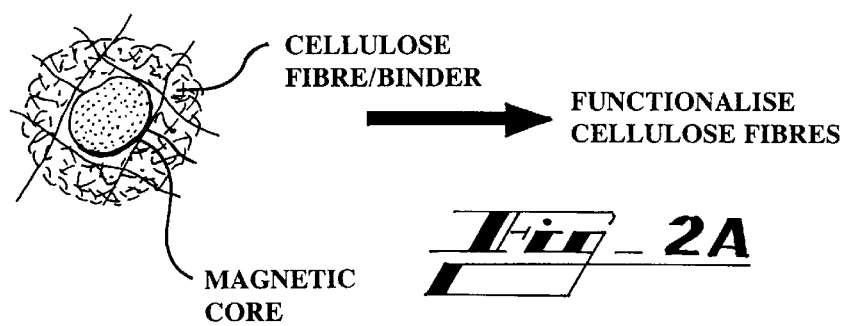
Fig_2A
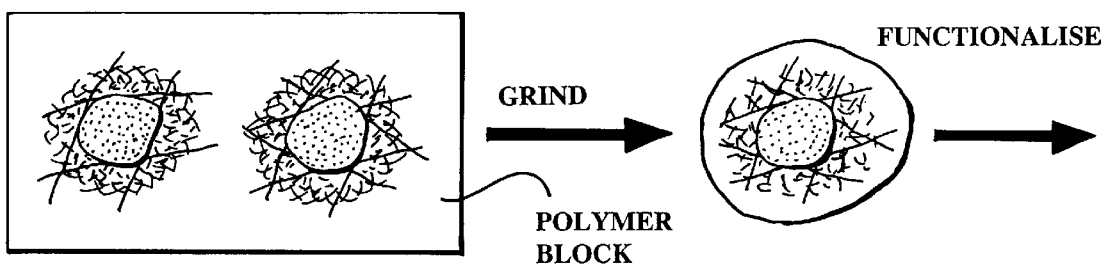
Fig_2B

MAGNETIC PARTICLES, A METHOD FOR THE PREPARATION THEREOF AND THEIR USE IN THE PURIFICATION OF SOLUTIONS

This application is a national stage application filed under 35 U.S.C. § 371 and claims priority based on International Application PCT/US95/01543 filed on Feb. 7, 1995 and United Kingdom Patent Application 94 02334.8 filed on Feb. 7, 1994.

The present invention relates to magnetic particles, a method for the preparation thereof and their use in a method for the purification of solutions, in particular aqueous solutions, in order to remove pollutant ions, such as heavy metals and radio-nuclides therefrom.

The purification of water to remove heavy metals and radionuclides is one of the primary tasks required for environmental clean-up. In many cases the water contains quantities of other solid or liquid materials which it would be uneconomic to recover together with the contaminants, and it is therefore desirable to be able to remove selectively the toxic materials in question. Most commonly in water treatment an undesirable constituent is removed by absorbing it onto, or converting it into, a solid phase. If this is done the material can be removed by physical settling or "column" operation, if the particles are large, or filtration, if the particles are small.

In order to treat large flow rates of water in small sized plants it is necessary for the transfer of pollutant to a solid phase to take place rapidly, which infers that small particles will be desirable. Also, if the particles are non-porous they will need to be small to achieve an adequate surface to volume ratio, thereby achieving a reasonable capacity for the pollutant In question. However, the filtration of small particles is normally difficult and energy intensive.

Selective ion exchange is well established as a technique for removing selected pollutants from water, in particular chelating ion exchange, in which the metals are held by organic chelating groups attached to a solid organic polymer. The binding reaction is typically reversed by exposure to acid Solutions.

It has been previously proposed to remove solid or liquid phases from liquid media by processes which involve a magnetic treatment.

For example, GB-A-2170736 describes the functionalisation of magnetite with sulphide groupings that attract heavy metals.

GB-A-2206206 describes a method of binding small particles reversibly to magnetic particles using a polyionic polymer to effect the binding, for the purposes of removing the small particles from solution. This method is particularly applicable to the clarification of solutions.

EP-A-0302293 describes the purification of solids and liquids by means of a granulate of magnetic particles mixed with a substance which absorbs the impurities to be removed. The granulate is produced by mixing the magnetic particles with the absorber and pressing the mixture.

U.S. Pat. No. 4,935,147 describes the separation of a substance from a liquid medium in which magnetic particles are coupled to non-magnetic particles by chemical means for nonspecifically binding the particles together. The chemical means for binding the particles together may be, for example, a polyelectrolyte. The binding is reversible.

U.S. Pat. No. 4,134,831 describes a process for removing pollutants from lakes, rivers or ocean sediments in which a selective ion exchanger is mechanically attached to magnetic particles, for example by mixing the ion exchanger with the magnetic material and forming granules therefrom. U.S. Pat. No. 4,661,327 describes a process for the removal of contaminants from soil by mixing the soil with a cation or anion resin polymerised on a magnetic core, followed by magnetic separation of the magnetic particles.

JP-A-63 175686 refers to a method for gathering metals by placing a magnetic support having a polymer containing chelate functional groups thereon in a solution containing metal ions.

EP-A-0522856 refers to a method for gathering metals by placing a magnetic support having a polymer coating containing embedded particles of selective ion exchanger in a solution containing metal ions.

If it is desired to produce composite particles with both magnetic and ion exchange properties it is essential that the parts of the particle responsible for each function are bound together with adequate strength to prevent breakage during use. For example, EP-A-0522856 showed that polymeric binding of particles is superior to use of static pressure in producing a durable composite particle.

The methods reported to date give particles with only limited durability and practicality for the following reasons:
  i) the process of grinding, frequently employed during the production of composite particles, leaves the magnetic core partially exposed to the solution. Many of the water chemistries required for treatment or chemical regeneration will cause partial dissolution of the magnetic core.
  ii) polymers used to bind the particles together can suffer swelling and shrinkage which weakens the binding.

We have now developed a method for producing a magnetic core which can be used subsequently for the production of composite particles which use either a polymer with chelating ion exchange functions to remove pollutant ions from solution, or selective ion exchange particles bound to the magnetic core by a method similar to that described in EP-A-0522856.

Accordingly, in one aspect the present invention provides magnetic particles which comprise a core of a magnetic material surrounded by a mixture of a fibrous material and a solid binding agent.

The present invention also provides a method for the preparation of magnetic particles as defined above which comprises stirring or mixing core particles of a magnetic material in a suspension comprising fibres of a fibrous material and a binding agent, causing the binding agent to solidify to bind the fibres around the core particles and separating the coated particles from the suspension.

The principle components of the magnetic particles of the present invention are a magnetic core, a fibrous material and a binding agent. The core may consist of particles of iron oxide or other magnetic material. The fibrous material may comprise an organic polymer in the form of fibres, such as fibres of carbohydrate polymers, urea formaldehyde or polynonamethylene urea, and, in particular, fibres of cellulose. The binding agent is a material which is introduced between the fibre strands as a liquid, or in solution, and is solidified during the production process of freezing, polymerization or evaporation of a solvent. Examples of suitable binding agents are agar, gelatin, an epoxy resin or urea formaldehyde furfuryl alcohol.

The magnetic particles of the present invention are produced by stirring or mixing the core particles in a suspension comprising fibres of the fibrous material and the binding agent. The fibres intertwine themselves around the core particles and the binding agent fills the interstices between the fibres. The binding agent is then solidified by one of the means as discussed above. An additional benefit can be obtained if, during the process of setting the binder, the fibres shrink around the core particles. Another additional benefit can be obtained if the fibres, once intertwined around the core particles, are chemically cross linked to one another, or to the binding agent.

An example of such a system, which is further described herein below, uses iron oxide as the core particles, cellulose fibres as the fibrous material and agar as the binding agent.

Particles of iron oxide are stirred in a "technical" viscose solution (cellulose fibres of approximately 20 micron length and agar, treated with sodium hydroxide solution to form a thick suspension). With stirring, the fibres of cellulose intertwine around the iron oxide core. The cellulose and agar are then cross linked with epichlorohydrin. Other cross-linking agents, such as formaldehyde, may also be used. In some cases epichlorohydrin is unsuitable for production scale application for health and safety reasons, in this case we have found that α,α-dichloro-p-xylene or 1,8-dichlorooctane can be used. The particles are then treated to remove alkali and baked at a temperature of about 150°. This process causes the cellulose fibres to shrink around the iron oxide core. Excess agar within the fibrous matrix melts during the baking process to form a densely packed coating around the iron oxide particles.

The present invention also includes within its scope a composite magnetic resin which comprises magnetic particles as hereinbefore defined embedded in a organic polymer matrix which either contains, or has attached thereto, sites which are selective for particular ions. It will be understood that all references throughout the specification to a "polymeric matrix" refer to an organic polymeric matrix or a matrix which is based on silicate polymers.

The composite may thus comprise magnetic particles embedded in a polymeric resin which contains active sites and as is well known in the art polymeric resin may be engineered to contain specific functional groups which are specifically intended to absorb selectively a particular pollutant ion, or a particular group of pollutant ions, such as metal ions, in the presence of other ions it is not desired to remove. For example, the polymeric resin may contain amidoxime groupings which selectively absorb heavy metals in the presence of alkali and alkaline earth metals, or phenol formaldehyde methylene sulphonic acid groupings for the removal of caesium, or quaternary ammonium groups for the removal of other pollutant anions.

Alternatively, the composite may comprise magnetic particles embedded in a polymeric resin which has small particles of selective absorbers bound thereto. The selective absorbers may be, for example, potassium cobalt hexacyanoferrate, manganese dioxide, hydrated oxides of titanium or aluminosilicates.

The base polymer which is used in either of the alternative approaches discussed above may be any polymer, for example a polyester or a cross-linked polyester/styrene co-polymer with a high proportion of active —OH groupings on the polymer backbone for conversion to the required functional groups, or may be specially formulated polymers which already contain the required functionality, for example, amidoxime. The base polymer also has the function of protecting the magnetic particles from attack by the aqueous solution. If the base polymer, with its selective functional groups is macroporous, then another polymer can be included therein to provide the requisite protection. In this case the base polymer comprises a mixture of polymeric components. The magnetic particles may be dispersed in a monomer, such as acrylamide, which may be polymerised to form a solid block. When the block is ground, the process of grinding does not expose the core, because the fibres provide significant reinforcement of strength in the neighbourhood of the core particles such that the solid will tend to fracture in places where no core particles are present. In the formulation of polymers to surround the magnetic particles agarose may be used to fill the interstices of the polymer. Agarose melts at a lower temperature than agar (60°–70° C. versus 80°–90° C.). Thus, during the curing of the polymer the temperature can be chosen to allow the agarose to melt while the agar binding agent is not affected.

The surfaces of the magnetic particles have fibrils emanating from then which make an excellent anchorage for polymers subsequently formed on the surfaces and the surface tension properties of the magnetic particles also make it possible to attract a thin coating of monomer on the surfaces thereof which can be polymerised as required. The monomer may also be mixed with small selective ion exchange particles which become embedded in the matrix when the monomer is polymerised.

Because of the restrictions in ion exchange capacity inherent in an impervious particle, previous composite particles have tended to have a small physical size (e.g. less than 20 micrometres). With the particles of the present invention, because they allow a porous surface (dedicated to the ion exchange duty) surrounding an impervious core (which contains the magnetic material), the restrictions on physical size are not nearly so important. Particles up to 100 micrometres in diameter containing a particular ion exchange resin may have ion exchange capacities of up to 30% of the pure ion exchange resin.

The composite magnetic particles of the present invention may be used in a method for the removal of pollutant ion from an aqueous solution in which they are contained, which method comprises the steps of:

i) contacting the solution to be treated with particles of a composite magnetic resin as hereinbefore defined;

ii) separating by magnetic filtration the composite magnetic resin particles from the solution;

iii) subjecting the separated composite magnetic resin particles to regeneration using an appropriate regenerant solution;

iv) separating the regenerated composite magnetic resin particles from the regenerant solution; and v) recycling the separated composite magnetic resin particles to step (i) of the method.

In carrying out the method of the present invention the composite magnetic resin particles are contacted with the solution to be treated. When the solution to be treated is an aqueous solution the composite magnetic resin particles may be contacted with a flowing stream of the solution. The composite magnetic resin particles are mixed with the solution and selectively absorb the pollutant ion(s) therefrom.

The composite magnetic resin particles, polluted with the pollutant ion(s), are then selectively removed from the solution by magnetic filtration using techniques which are known in the art. The composite magnetic resin particles are then recovered from the filter and the pollutant ion(s) removed therefrom using an appropriate regenerant solution, for example an acidic solution. The cleaned composite magnetic resin particles can then be recovered from the regenerant solution by magnetic filtration and the clean particles recycled to the first step of the method.

The present invention will be further described with reference to the accompanying drawings, in which:

FIG. 1 illustrates the method of the invention for the removal of pollutant ions; and FIG. 2A illustrates schematically the formation of magnetic particles in accordance with an embodiment of this invention.

FIGS. 2B, 2C, 2D and 2E illustrate schematically the formation of various composite magnetic resin particles in accordance with the invention.

Figure 2C:
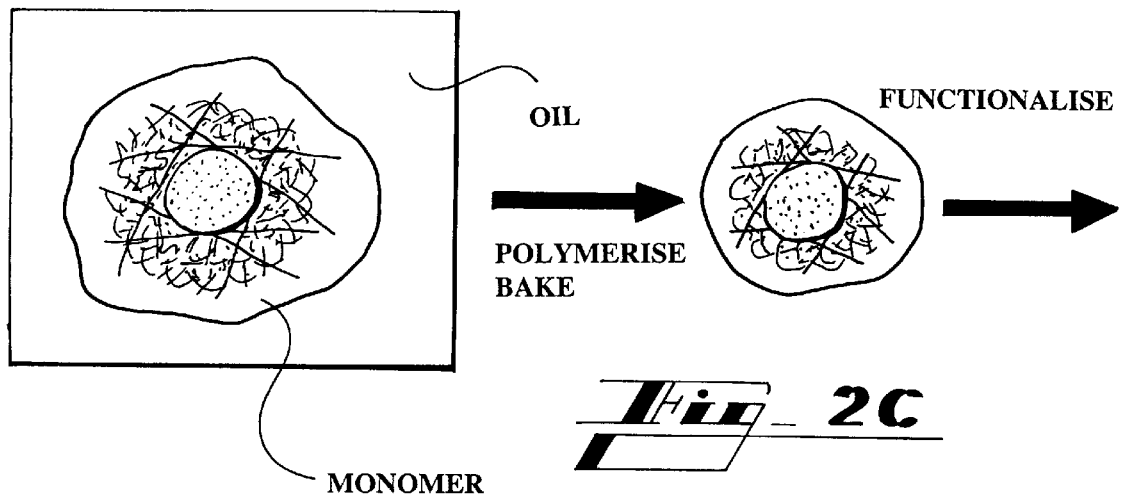

Referring to FIG. 1, a water purification unit is shown generally at 1. Decontaminated water 2 enters a mixing cell 3 where it is mixed with an appropriate amount of composite magnetic resin particles which are chosen so as to remove the unwanted pollutant ion or ions from the contaminated water. The treated water then enters a magnetic separator 4. The contaminated resin particles 5 are separated from the clean water 6 which exits from the water decontamination unit 1. The contaminated resin particles 5 are then passed to an appropriate chamber where decontamination takes place at 7. The cleaned resin particles are separated from the contaminated regenerant by means of a magnetic separator, the contaminated solution being passed to an isolation unit 8, whilst the clean resin 9 is returned to the mixing cell 3 for further use.

With reference to FIGS. 2A to 2E of the accompanying drawings, these Figures illustrate some of the options for the formation of composite magnetic particles in accordance with the invention.

In FIGS. 2A, the cellulose and agar are cross-linked, and the exposed cellulose filaments can be functionalised.

In FIG. 2B a monomer is polymerised around magnetic particles in accordance with the invention to form a solid block of polymer. The block is then ground to create small particles. The iron core with its cellulose coating provides strength to the ground particles which are then functionalised.

FIG. 2C provides an alternative approach to that of FIG. 2B in which the polymerisation is conducted with the particles dispersed in oil, which thus creates discrete, round particles of controlled size.

Figure 2D:
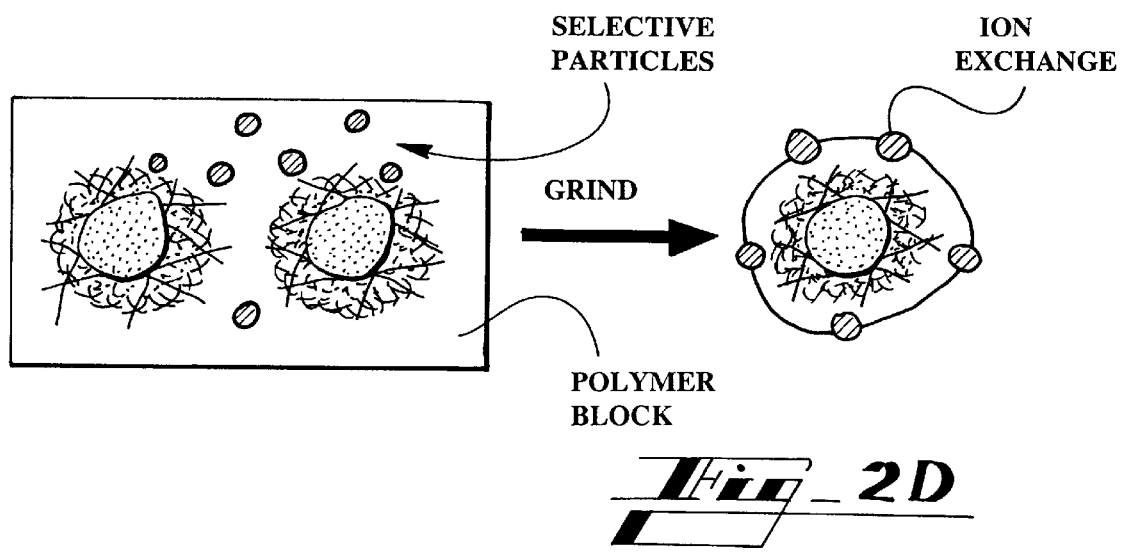
Figure 2E:
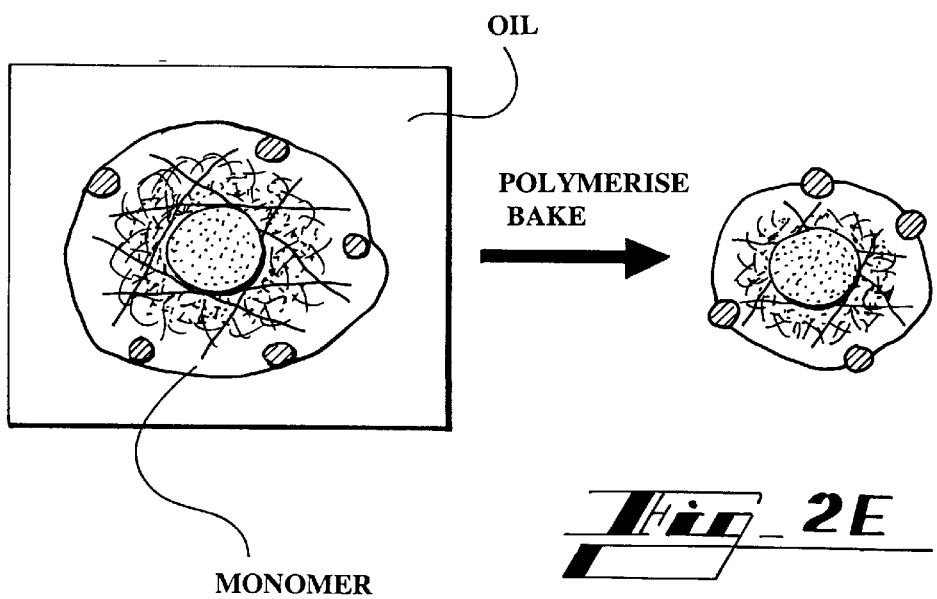

Referring to FIGS. 2D and 2E, these are similar to FIGS. 2B and 2C but with ion exchange resin particles incorporated therein. Referring to FIG. 2D, the polymer is particularly strongly bound to the cellulose fibres, which encourages exposure of the ion exchange resin particles during grinding.

EXAMPLE 1
(Preparation of Magnetic Core)

Microcrystalline cellulose of average 20 micrometres length was obtained from Sigma Chemicals. Agar was obtained from Aldrich Chemicals. Cellulose (100 g) and agar (14 g) were dispersed in a solution of 1.9 Molar sodium hydroxide (1 litre). The mixture was agitated (stirring speed 250 rpm) for 24 hours. Magnetite (7 to 12 micrometres particle size, 320 g) was added and the mixture agitated more vigorously (stirring speed 350 rpm) for a further 24 hours. Epichlorohydrin (92.5 g) was added and the mixture stirred (stirring speed 460 rpm) for 1 hour. Distilled Water (1 litre) was added and the mixture was heated to 90° C. for 2 hours, with the addition of hot distilled water to maintain the volume. The mixture was cooled to room temperature, and the magnetic material was held in place with a magnet while the supernate was decanted off. The magnetic material was washed with ethanol and was stirred in 1.2M acetic acid in ethanol (2 litres) for 2 hours (stirring speed 240 rpm). The magnetic material was separated by decantation of the supernate as before, and agitated in 90% acetone in water (2 litres). The magnetic material was separated and dried briefly at 150° C. to produce solid granules of 35 to 50 micrometres in diameter.

EXAMPLE 2
(Preparation of Magnetic Core)

Cellulose (100 g) and agar (14 g) were dissolved in a solution of 1.9 Molar sodium hydroxide (1 litre). The mixture was agitated (stirring speed 250 rpm) for 24 hours. Magnetite (7 to 12 micrometres particle size, 320 g) was added and the mixture agitated more vigorously (stirring speed 350 rpm) for a further 24 hours. Epichlorohydrin (92.5 g) was added and the mixture stirred (stirring speed 460 rpm) for 1 hour. The mixture was slowly dispersed in 3 litres transformer oil of viscosity 100 cSt. The mixture was heated to 90° C. for 2 hours. The mixture was then cooled to 50° to 55° C., and the magnetic material was held in place with a magnet while the supernate was decanted off. The magnetic material was washed with benzene, ethanol and was stirred in 1.2M acetic acid in ethanol (2 litres) for 2 hours (stirring speed 240 rpm). The magnetic material was separated by decantation of supernate as before, and agitated in 90% acetone in water (2 litres). The magnetic material was separated and dried briefly at 150° C. to produce solid granules of 35 to 50 micrometres diameter.

EXAMPLE 3
(Polymerisation of Acrylamide onto Magnetic Core)

Acrylamide (300 g), N,N-methylene bis acrylamide (5.54 g), and N,N,N',N' tetramethylenediamine (TEMED) (5 ml) were dissolved in distilled water (350 ml). Granules prepared as in Example 1 (119 g) and agarose (8 g) were added and the mixture stirred gently for 1.5 hours. 0.25% Ammonium persulphate solution (25 ml) was added to achieve polymerisation. The polymer was left to cool to room temperature and ground to 50 to 250 micrometres diameter.

EXAMPLE 4
(Polymerisation of Acrylamide onto Magnetic Core)

Acrylamide (300 g), N,N-methylene bis acrylamide (5.54 g), and N,N,N',N' tetramethylenediamine (TEMED) (5 ml) were dissolved in distilled water (350 ml). Granules prepared as in Example 1 (119 g) and agarose (8 g) were added and the mixture stirred gently for 1.5 hours. The time required to completion of polymerisation was determined by addition of ammonium persulphate to a small sample. Ensuring that the temperature was less than 10° C., 0.25% ammonium persulphate solution (25 ml) in water was added and the mixture dispersed in 4 litres transformer oil of viscosity 100 cSt. By adjusting the stirring rate the dispersion was timed to be completed within the period determined for completion of polymerisation. Agitation was continued for a further 45 minutes. The product was washed with benzene, ethanol, water and dried at 80° C. The product was stored in a moist condition. Yield 400 g of spherical beads diameter 50 to 250 micrometres.

EXAMPLE 5
(Amidoxime functionalised Chelating Magnetic Ion Exchanger)

The acrylamide material of Example 4 was converted into an amidoxime functionalised chelating magnetic ion exchanger by the following method.

Hydroxylamine hydrochloride (1.73 mol) was dissolved in water (200 ml). A cold solution of 40% sodium hydroxide (70 g NaOH) was added and the mixture held at between 5° and 10° C. 110 g Polyacrylamide beads prepared by the method of Examples 3 or 4 were added in small portions, keeping the temperature below 10° C. The mixture was stirred gently for 16 hours at 4° C., then the liquid was decanted holding the magnetic material in place with a magnet. The magnetic material was washed with water, hydrochloric acid (0.1M), water, sodium hydroxide (0.1M) and finally water until the washings were pH neutral. The product was stored moist at room temperature. After six months storage the nitrogen content of the product decreased by 14.86%. For prolonged storage the beads should be stored in the acrylamide state (i.e. the product from Example 4).

The capacity of the product beads to absorb copper was determined by the following test. Product beads (1 g) were added to water (24 ml) and standard copper sulphate solution (1 ml, 1,000 ppm copper). The mixture was shaken in a mechanical shaker for 30 minutes. Five containers were prepared, each containing one "CUVER" bicinchinonate reagent powder pillow for analysis of copper (available from Hach Company, Loveland, Colo.). 5 ml of the supernate was pipetted into the first copper analysis container. If no colour developed on shaking, a further addition of water (4 ml) and standard copper sulphate solution (1 ml) was made to the particle beads and the shaking and analysis steps repeated. The procedure was repeated until the analysis solution is coloured pink. Smaller quantities of copper sulphate solution may be added in the final stages of the procedure, as desired, to define the end point more closely.

The amount of copper absorbed by 1 g of product beads was determined from the amount of standard copper sulphate solution added before the colour appeared.

The capacity of the product beads was found to be 2200 2 mg Cu/g beads.

EXAMPLE 6

This procedure forms a weak acid cation exchanger with a carboxylic acid functionality.

Polyacrylamide particles (100 g) from Example 3 or 4 were suspended in acetic acid (1.0M, 500 ml) at room temperature. An aqueous solution of sodium nitrite was added dropwise until excess nitrite was found to be present 15 minutes after the last addition (e.g. using potassium iodide starch paper test). The mixture was warmed gently at 55° C. for two hours, the liquid was decanted holding the magnetic material in place with a magnet. The product was washed with water, acetic acid (0.5M) and then with water, dried at 60° C. and stored at room temperature.

EXAMPLE 7

This procedure produces a caesium selective magnetic particle.

Phenol (4.7 g) and resorcinol (16.5 g) were dissolved in ethanol (120 ml) and formaldehyde (36% solution, 50 ml) and sodium hydroxide (40% solution, 12 ml) were added. The mixture was heated under reflux with vigorous stirring for 4 hours. Resorcinol (22 g) in ethanol (60 ml), formaldehyde (36% solution, 50 ml), sodium hydroxide (40% solution, 6 ml) and magnetic particles from Example 1 (11 g) were added. Heating under reflux was continued for 2 hours, and the mixture was then heated in an evaporating dish for 8 hours with occasional stirring. The dish was placed in an oven at 105° C. and the cake ground to the required size (70 to 200 micrometres). The resulting granules were extracted with ethanol in a Soxhlet apparatus, dried at 80° C. activated by washing with hydrochloric acid (5%), sodium hydroxide (1 Molar) and then washed to pH neutral with water. The product was stored moist after decantation of water. Yield 55 g.

A solution of caesium bromide (0.1064 g) was made up in water (500 ml). Caesium-137 radiotracer was added (10 Bq/ml). A sample of the product (0.1 g) from above was added to this solution (20 ml) and stirred for 15 minutes. The particles were then separated from the liquid. The capacity of the particles for caesium was measured by gamma spectrometric measurement of the solution prior to and following contact and separation of the particles.

The capacity was found to be 0.182 milliequivalents of caesium per gram of particles.

EXAMPLE 8

Phenol (37.6 g) and sulphuric acid (98%,50 g) were heated on a steam bath for 1 hour and cooled to room temperature. To half the phenol-sulphonic acid, phenol (4.7 g) in 120 ml ethanol, sodium hydroxide (40%, 12 ml) and formaldehyde (36%, 75 ml) were added to the mixture. Half of this mixture was heated under reflux with vigorous stirring for 4 hours. To the remainder of the mixture, sodium hydroxide (40% 12 ml), and 12.5 g of granules prepared according to Example 1 were added. Heating under reflux was continued for 2 hours, the mixture was then heated in an evaporating dish for 8 hours with occasional stirring. The dish was placed in an oven at 105° C. and the resulting cake ground to the required size (70 to 200 micrometres). The resulting granules were extracted with ethanol in a Soxhlet apparatus, dried at 80° C., activated by washing with hydrochloric acid (5%), sodium hydroxide (1 Molar) and then washed to pH neutral with water. The product was stored moist after decantation of water. Yield 62 g.

EXAMPLE 9

The following procedure produces a caesium selective magnetic particle.

Acrylamide (361.2 g), bis-acrylamide (47.1 g) and TEMED (34 ml) were dissolved in distilled water (660 ml). Granules prepared in Example 1 (412 g) and agar (29 g) were added and stirred for 30 min, followed by addition clinoptilolite (a naturally occurring selective ion exchange material, 525 g). After a further 1 hour stirring, polymerisation was induced by the addition of ammonium persulphate in water (0.25%, 37 ml). The polymer block was ground to 70 to 220 micrometre particles and baked for 6 hours at 150° C. Yield 1360 g. The resulting particles were rinsed in a solution of polystyrene (5%) in 1:1 benzene:acetone. The particles were then washed briefly in acetone and air dried.

A sample of fresh milk from the Rovno region of the Ukraine was found to contain radiocaesium contamination (951 Bq/litre). This milk (200 ml) was contacted (by stirring) with the particles (2.0 g) and the milk was then separated from the particles by decantation while retaining the particles with a magnet. This treatment was repeated three further times with a fresh batch of particles. The radiocaesium activity in the treated milk was found to be 51 Bq/litre.

EXAMPLE 10

(MacroPorous Magnetic Material from Selective Ion Exchanger)

Acrylamide (361.2 g), bis-acrylamide (33 g) and TEMED (34 ml) were dissolved in distilled water (660 ml). Granules prepared as in Example 1 (412 g) were added and stirred for 30 min, followed by the addition manganese dioxide (a selective ion exchange material, 568 g). After a further 1 hour stirring, polymerisation was induced by the addition of ammonium persulphate in water (0.25%, 37 ml). The polymer block was ground to 70 to 220 micrometres and baked for 6 hours at 150° C. The resulting particles were rinsed in a solution of polystyrene (5%) in 1:1 benzene:acetone. The particles were then washed briefly in acetone and air dried.

This procedure, which yields a lower degree of cross-linking than Example 9, is appropriate for small size particles of selective ion exchangers (e.g. less than 10 micrometres). The outer layer is more porous, allowing deeper penetration of solution to the final product particle, but produces a product which is not capable of adequately anchoring larger selective ion exchange particles.

EXAMPLE 11
Amino form of Imino Diacetic Acid (IDA)

Dry cellulose (200 g) was swollen in dry dimethyl formamide DMF (800 ml), overnight. Phosphorus oxychloride (800 g) was added with stirring to dry DMF (6,000 ml). The mixture was heated to 75° C., the cellulose slurry was added with vigorous stirring, the temperature was then increased to 95° C. and maintained for 30 min. The mixture was then poured in to 3 beakers each containing 1.5 Kg crushed ice.

The chloro-cellulose was filtered off, washed with DMF, water, sodium hydroxide (0.5M), acetic acid (0.5M), and water to pH neutral. To a mixture of iminodiacetic acid (133 g), sodium hydroxide (80 g), distilled water (250 ml) and DMF (1200 ml), the chloro-cellulose was added with vigorous stirring and heating to 107° C. for 8 hours. The volume was maintained by adding hot distilled water. The hot cellulose-IDA was filtered hot, washed with water, acetic acid (0.5M), sodium hydroxide (0.5M) and water to pH neutral. Acrylamide (90 g), bis-acrylamide (10 g) and TEMED (15 ml) were dissolved in water (300 ml), cellulose-IDA (200 g) and granules of Example 1 (60 g) were stirred for 30 min. Polymerisation was initiated by the addition of ammonium persulphate (4.1% 20 ml). The semi-dried cake was ground to 75 to 212 micrometres. Capacity: approx. 3500 2 mg Cu/g dry resin.

EXAMPLE 12
Comparison of Conventional Particle and Particles produced by the method of the present invention Product 1 was a product produced by a method which generally follows the procedure in patent EP-A-0522856.

Acrylamide (361.2 g), bis-acrylamide (33 g), TEMED (34 ml) and agarose (8 g) were dissolved in distilled water (660 ml). Magnetite (7 to 12 micrometres particle size) was added and stirred for 30 min, followed by addition Transylvanian Volcanic Tuff (a naturally occurring plutonium selective ion exchange material, 568 g). After a further 1 hour stirring, polymerisation was induced by the addition of ammonium persulphate in water (0.25%, 37 ml). The polymer block was ground to 70 to 220 micrometres and baked for 6 hours at 150° C.

Product 2 was produced by the method of the present invention.

Acrylamide (361.2 g), bis-acrylamide (33 g) and TEMED (34 ml) were dissolved in distilled water (660 ml). Granules prepared as in Example 1 (412 g) were added and stirred for 30 min, followed by addition Transylvanian Volcanic Tuff (568 g). After a further 1 hour stirring, polymerisation was induced by the addition of ammonium persulphate in water (0.25%, 37 ml). The polymer block was ground to 70 to 220 micrometres and baked for 6 hours at 150° C. Yield 1360 g.

Products 1 and 2 were examined by EDAX to determine the relative abundance in the outer 10 micrometres depth of silicon (due to the TVT) and iron (due to the iron oxide). The results showed that for product 1 the elemental ratio was 60.38 Iron to 27.85 silicon. In product 2 the elemental ratio was 32.04 Iron to 53.49 silicon.

It is apparent from these results that product 2 contains more of the selective ion exchanger and less of the iron oxide in the surface layer than is the case with product 1.

EXAMPLE 13
Amino Form of Imino Diacetic Acid (IDA) on Phenolic Polymer

Phenol (108.23 g) was dissolved in 10 Molar sodium hydroxide solution (115 ml), 35% formaldehyde (304 ml) was added and stirred at 240 rpm at 30° C. for 5 hours. A solution of iminodiacetic acid di-sodium salt monohydrate (195.08 g) in water (150 ml) was added and heated at 50° C. for a further 4 hours. Granules from Example 1 (95 g) were added and stirred for 1 hour. The contents were poured into a porcelain evaporating basin on a sand bath at 95° to 100° C. When a homogeneous thick viscose was obtained (approx. 4 to 6 hours) the basin was transferred to an oven at 105° C., the dried magnetic cake was separated from the basin after 36 hours, ground to 45 to 420 micrometres, washed with distilled water to clear neutral supernatant. Dry yield 400 g.

The IDA sodium form material prepared above was contacted (by stirring) with 3 bed volumes of 1 molar hydrochloric acid, the acid was then separated from the particles by decantation while retaining the particles with a magnet. This process was repeated one more time. The previous treatment was repeated using distilled water to neutral supernatant. The amino form was produced by washing the neutral product with 2 bed volume of 2 molar ammonium hydroxide twice, followed by 1 bed volume 0.1 molar ammonium acetate buffer (pH 5.5) then filtered to a thick slurry. The thick slurry was washed briefly with distilled water before use. Metal capacity was in excess of 85,000 $\mu$g Cu/g dry product.

EXAMPLE 14
Silica Based Polymer

Solution 1 was prepared as follows: Sodium silicate (122 g), was dissolved in distilled water. Trimethyl silane (8 ml) and granules prepared as per Example 1 (26 g) were added and stirred at 240 rpm for 30 min.

Solution 2 was prepared as follows: Glacial acetic acid (134 ml) was mixed with distilled water (500 ml). The two solutions (1 & 2) were simultaneously charged into a 2 litre polypropylene beaker, (and stirred at 240 rpm) at rates proportional to the respective total volumes. Polymerisation occurred after approximately 4 hours and the magnetic gel was left to mature for a further 6 hours. The gel was broken into small lumps and transferred to an enamel coated metallic tray. Distilled water (500 ml) was added gently to the gel and left for 30 minutes, then drained. This treatment was repeated seven times. The gel was heated in an oven at 110° C. for 16 hours, followed by 42 hours at 200° C., cooled, ground to 106 to 212 micrometres, washed with distilled water (while the particles were retained by a magnet to clear supernatant.

We claim:

1. Magnetic particles which comprise a core of a magnetic material surrounded by a mixture of a fibrous material and a solid binding agent.

2. Magnetic particles according to claim 1 wherein the core comprises iron oxide.

3. Magnetic particles according to claim 1 wherein the fibrous material comprises fibres of an organic polymer.

4. Magnetic particles according to claim 3 wherein the organic polymer comprises cellulose.

5. Magnetic particles according to claim 1 wherein the binding agent comprises agar.

6. Method for the preparation of magnetic particles which comprise a core of a magnetic material surrounded by a mixture of a fibrous material and a solid binding agent, which method comprises the steps of:

i) preparing a suspension comprising fibers of a fibrous material and a binding agent;

ii) mixing core particles of a magnetic material into the suspension;

iii) causing the binding agent to solidify to bind the fibers around the core particles and form the magnetic particles; and iv) separating the magnetic particles from the suspension.

7. Method according to claim 6 wherein the binding agent is caused to solidify by freezing, polymerisation or evaporation of a solvent.

8. Method according to claim 6 wherein the fibrous material comprises cellulose and the binder comprises agar which is cross-linked with epichlorohydrin, α,α-dichloro-p-xylene or 1,8-dichlorooctane.

9. Method according to claim 6 wherein the magnetic particles are heat treated.

10. Method according to claim 6 wherein at least some of the magnetic particles are in the form of aggregates after separation from the suspension and the method further comprises comminuting the aggregates.

11. A composite magnetic resin which comprises magnetic particles which comprise a core of a magnetic material surrounded by a mixture of a fibrous material and a solid binding agent embedded in a polymer resin which incorporates sites which are selective for particular ions.

12. A composite magnetic resin according to claim 11 wherein the magnetic particles are embedded in an organic polymeric resin which (contains) comprises functional groups specifically intended to absorb selectively a particular ion or particular ions.

13. A composite magnetic material according to claim 12 wherein the resin comprises functional groups selected from the group consisting of amidoxime groups, phenol formaldehyde groups, methylene sulphonic acid groups, and quaternary ammonium groups.

14. A composite magnetic material according to claim 11 wherein the magnetic particles are embedded in an organic polymeric resin which has particles of selective absorbers bound thereto.

15. A composite magnetic material according to claim 14 where the selective absorbers are selected from the group consisting of potassium cobalt hexacyanoferrate, manganese dioxide, hydrated oxides of titanium and aluminosilicates.

16. A composite magnetic material according to claim 11 wherein the magnetic particles are embedded in a silicate based polymer.

17. A method for the removal of ions from an aqueous solution in which they are contained, which method comprises the steps of:

i) contacting the solution to be treated with particles of a composite magnetic resin which comprises magnetic particles which comprise a core of a magnetic material surrounded by a mixture of a fibrous material and a solid binding agent embedded in a polymer resin which incorporates sites which are selective for particular ions;

ii) separating by magnetic filtration the composite magnetic resin particles from the solution;

iii) subjecting the separated composite magnetic resin particles to regeneration using an appropriate regenerant solution;

iv) separating the regenerated composite magnetic resin particles from the regenerant solution; and v) recycling the separated composite magnetic resin particles to step (i) of the method.

18. Method according to claim 17 wherein the composite resin particles are contacted with a flowing stream of the solution to be treated.

19. Method according to claim 17 wherein the composite magnetic material which have selectively absorbed the pollutant ion(s) are regenerated by contacting them with an acidic regenerant solution.

20. Method according to claim 17 wherein the pollutant ions are metal ions.

* * * * *